Patented June 29, 1926.

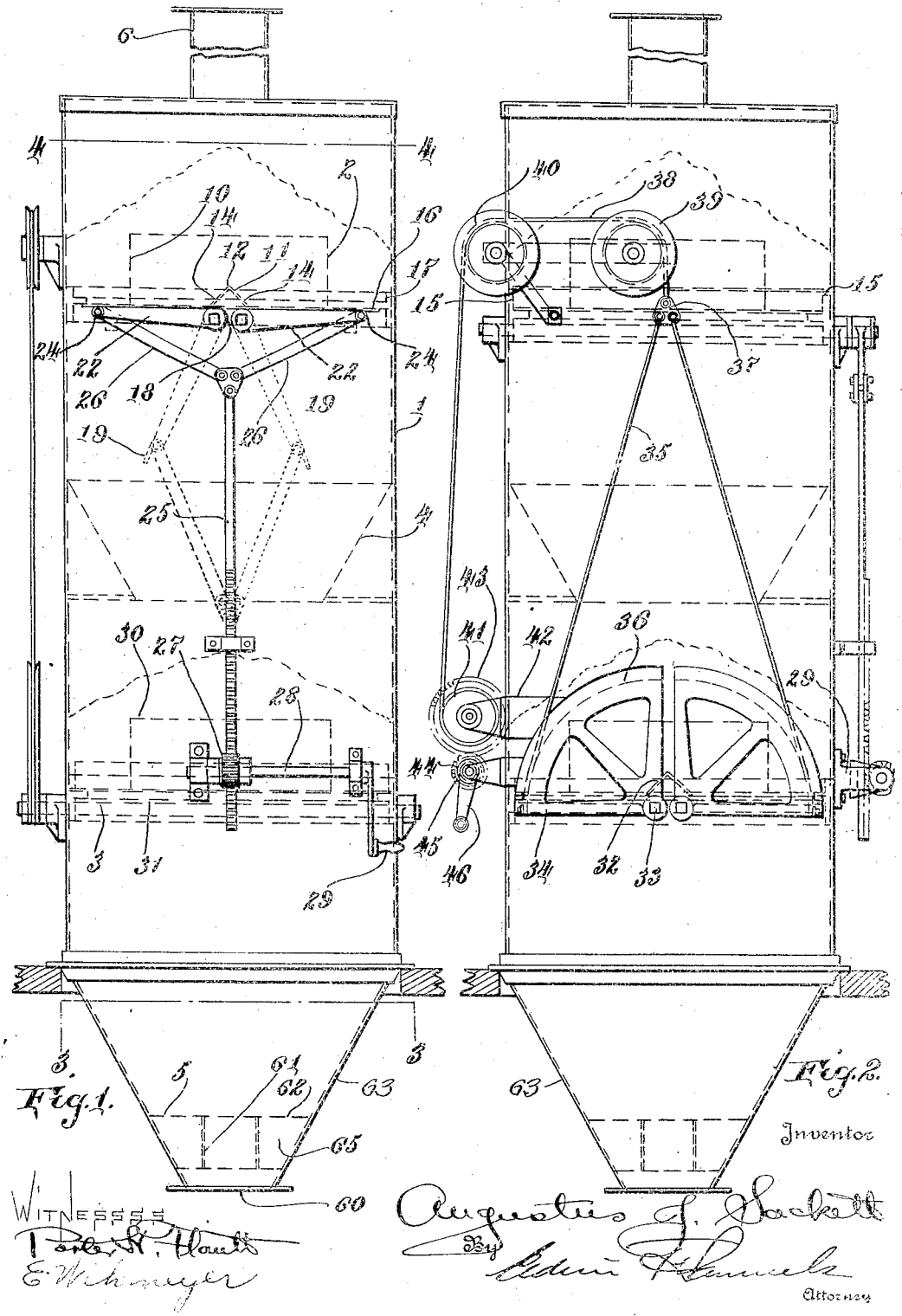

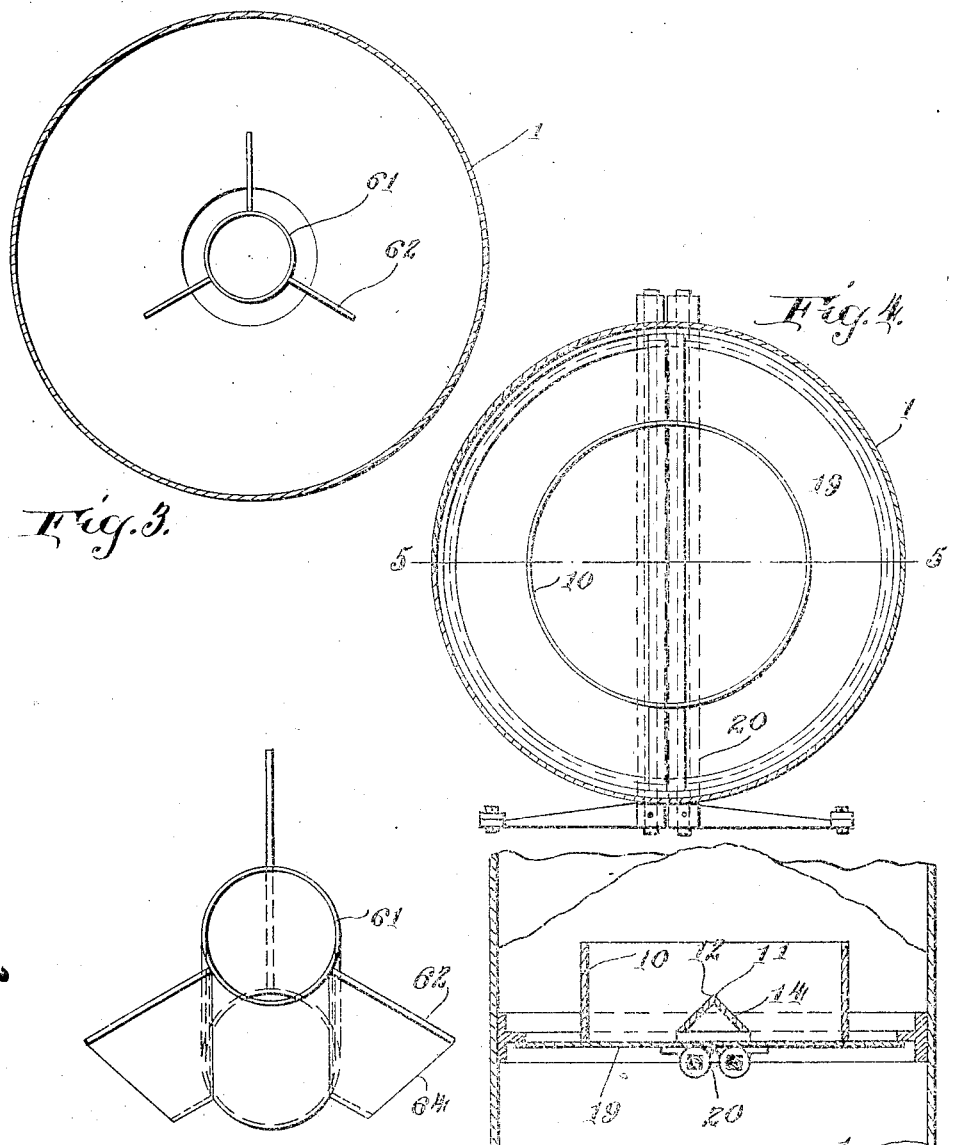

1,590,647

UNITED STATES PATENT OFFICE.

AUGUSTUS J. SACKETT, OF BALTIMORE, MARYLAND.

GRAVITY MIXER.

Application filed December 3, 1925. Serial No. 72,884.

The present invention relates to a fertilizer mixer termed in the trade a batcher which is an improved commercial structure embodying some of the basic principles disclosed in my United States Patent No. 1,551,623.

The primary principle involved is the distribution of the fertilizer as it is poured into the batcher among a plurality of receptacles, from which it is released simultaneously, the relative positions of the particles being changed substantially without regard to their different specific gravities.

The form previously disclosed comprises a hopper having a central enclosure over which is a deflector, so that the material being poured from the top centre is deposited first at the sides and then overflows from the sides to the centre. The bottom of the hopper is in the form of a door which when opened releases the material from the receptacles and permits them to flow downward from different sources effecting mixing.

In the improved form there is a central nest or enclosure, and the central nest is filled first, the material thereafter being heaped up on the central nest, flows over into the sides of the hopper which form a separate receptacle. Beneath the first mixing unit in the preferred form of mixer, is a second similar unit, the mixing operation being thus repeated and perfected. The intermediate portion of the batcher is preferably further so constructed that the material from the sides of the hopper or upper unit, as it flows downwardly, is deflected inwardly, so that it is deposited in the centre nest of the lower unit.

A further feature of the present device is a centrally placed deflector just above the doors, which, the doors being centrally pivoted, not only assists in the function of turning the material outwardly from the centre to the sides, but deflects the material from the central meeting hinged edges of the doors where it would otherwise clog them and interfere with their operation. The shield not only assists in the mixing, but makes feasible the use of centrally hung doors in this connection.

The doors swinging downward from the centre deflect the material from the nest toward the sides, and the side portions are partially closed by the door frame, retarding flow from the sides. The streams from the centre and sides thus being mingled at different rates of flow, effect most complete mixing.

In the form shown the doors of the lower mixer are operated by different mechanism from that operating the upper doors, this being for the purposes of convenience on account of the lack of space at the bottom for the vertical rack used in operating the upper doors, the door-operating means not being regarded as an important feature of the invention.

A new feature of the batcher which is regarded as of interest in this connection is embodied in the discharge control and mixing member at the lower or discharge end of the batcher. This prevents choking and effects further mixing by accelerating part of the stream and retarding part of it.

In the accompanying drawing I have illustrated a fertilizer batcher embodying the features of my invention in the preferred form.

In the drawing—

Figure 1 is an elevation of the batcher complete.

Figure 2 is an elevation looking from the left in Figure 1.

Figure 3 is a horizontal section on the line 3, 3 of Figure 1 looking downward.

Figure 4 is a horizontal section on the line 4, 4 of Figure 1 looking downward.

Figure 5 is a fragmentary section on the line 5, 5 of Figure 4 showing the bottom of one hopper.

Figure 6 is a perspective of the discharge control looking downwardly at the same and from the side.

Referring to the drawings by numerals, each of which is used to indicate the same or similar parts in the different figures, the apparatus comprises a batcher casing 1 of any suitable construction, containing one or more mixer units 2, 3, the upper unit being referred to as a hopper, as it receives and holds the constituents of the batcher as introduced. The lower unit may be referred to for convenience as the lower hopper.

The apparatus, as shown, also includes a central deflector 4 for turning the material inward toward the centre of the lower unit 3 and a discharge control 5 which prevents clogging, and by separating the material in effect into two streams of different velocity, effects further mixing.

The material is fed to the hopper through a top central feed opening or passage 6, and preferably passes through the machine by gravity. The hopper mixer or top mixing unit 2 comprises a central nest 10 shown in the form of a short cylindrical upright wall open at the top and bottom and supported intermediately of the horizontal cross-section of the batcher casing, which though shown circular or cylindrical, may be of any preferred form, the nest likewise being of any preferred horizontal section.

In the form shown the nest 10 is supported on a diametrically placed transverse member 11 in the form of an angular deflector having its vertex 12 upwardly disposed and having downwardly and outwardly inclined side surfaces 14. This deflector is supported at its ends on the side walls of the batcher at 15 in any suitable manner. In the form shown the transverse member or shield 11 rests at its ends on an inwardly projecting horizontal ring 16 secured to the walls of the batcher in any suitable manner as by angle flanges or legs 17 which may be riveted or spot-welded or otherwise attached. The member 12, in addition to supporting the nest 10, acts as a shield for the meeting edges and hinges 18 of the mixer doors 19, see particularly Figure 5, which shows this arrangement in detail. The doors 19 are shown as semi-circular and are mounted at their straight diametrical edges on hinge shafts 20 suitably supported at their ends in the walls of the batcher and preferably extend across the batcher beneath the shield 11. The doors 19 being pivoted at the centre, bear at their edges when closed against the horizontal ring 16 from beneath, swinging downwardly therefrom into open position, as illustrated in dotted lines in Figure 1.

Levers 22 secured to the respective shafts 20 and extending outwardly therefrom, actuate the doors, the actuating means being preferably on the outside as shown clearly in Figures 1, 2 and 5. The outer swinging ends 24 of the levers 22 are connected to an upright rack 25 which is mounted to slide vertically along the side of the casing by means of connecting rods 26. The rack 25 is in turn engaged by a pinion 27 on a horizontal shaft 28 mounted in bearings on suitable brackets (see Figure 2) on the side of the casing and rotated in any suitable manner at the will of the operator as by means of a hand crank 29.

The intermediate deflector 4, as has been already described in general terms, is in the cylindrical form of batcher shown, a frusto-conical member placed with its smaller end down, open at the diametrical ends and secured co-axially with the batcher member or casing 1 in any suitable manner as by riveting or spot-welding. At the lower portion of the machine I have shown a second mixer unit indicated by reference character 3, it being the present intention to assemble the units either singly or with as many of them in vertical alignment as may be suited to the particular purpose in hand, the present commercial apparatus having two units, one over the other, as in the device herein disclosed.

The lower unit in the apparatus shown comprises a central nest 30 which may be identical with the upper nest 10, centrally pivoted downwardly swinging doors 31, a shield 32 and shafts 33, all, as in the mixing unit already described, placed at the bottom of the hopper in the upper part of the batcher though the details of either unit may be varied without reference to the other within the scope of my invention.

For convenience on account of the lack of space at the bottom of the machine or the play of the rack 25, the doors 31 shown with their shafts 33 at right angles to the shafts 20 of the upper unit, are actuated by different types of mechanism. The actuating device for the second mixer consists of quadrants 34 secured to the respective shafts 33 at their ends outside the casing, each quadrant being grooved to receive a cable or similar tension member 35 which is secured to the periphery thereof in or adjacent the groove 36 at the lower and outer end of said groove, the quadrants being in the closed position of the doors, placed as shown in Figure 2, forming a semi-circle on the upper side of the doors.

The cables 35 extend upwardly and are joined at 37 near the upper part of the casing, the single cable 38 connected to the two cables 35 as joined at 37, being passed around and over guide shives 39 and 40 mounted at the top of the casing and downwardly to a drum 41 mounted below, preferably on the casing on a suitable bracket 42, the drum having secured thereto, co-axially therewith, a toothed gear 43 which meshes with a pinion 44 on a shaft 45 suitably mounted and actuated by suitable means in the control of the operator, as hand crank 46.

The discharge control member 5 placed in the outlet or discharge end of the batcher, prevents clogging of the discharge opening 60, and serves a mixing function by dividing the material into a plurality of streams of different velocities which are delivered into a receptacle below the discharge opening at substantially the same point therein, so that as the discharged material piles up and flows laterally seeking a common level, still a third or additional mixing operation is performed.

The discharge control member 5 consists of a central straight passage with means for enclosing the same 61, and radiating supports 62 by which the member 5 is supported in the discharge opening intermediately thereof.

In the form of the device illustrated, the lower or discharge end 63 of the batcher is in the form of an inverted frustum of a cone, the opening 60 being at the small end or base of the frustum. The discharge control member or mixer 5 as shown is in the form of a central open ended cylinder or tubular member 61, the exact form of the cross-section being immaterial. The tubular member 61 is of an area which is a considerable proportion of the area of the discharge opening 60, and is provided with radiating plates or supports 62, which as shown are formed integrally or secured to the members 61 at their inner end and preferably inclined or otherwise formed as to their outer edges 64 to engage the frusto-conical member 63 whereby the passage member 61 is spaced away from the walls of the member 63. This arrangement provides a central vertical passage 61 through which the material flows at comparatively rapid rate, and circumferential passages 65 having converging walls through which the material flows at a comparatively slower rate on account of the tendency to clog and fill the entrance. A portion of the material is thus quickly delivered, and other portions are checked and delivered at a slower rate, the part flowing through one passage being taken from the centre, and the part flowing through the other passage being taken from the sides of the batch. In this way a most efficient mixing of the portions of the material at the centre and sides will be accomplished. The straight centre passage also prevents clogging and the velocity of the material from this passage contacting with that from the side passages, keeps both passages open.

The details and operation of the various units have been fully discussed in the description and the functions thereof have been outlined in the preamble, so that the operation of the machine will be well understood.

The material being introduced at the centre through the top opening 6 will be first deposited in the top unit in the central nest, and on filling the nest, will overflow the walls to the outside, the centre being then filled up as indicated in dotted lines in Figure 1. The doors of the first unit being then opened, the material will flow downward through the funnel-like member 4 from the centre and sides, the material at the sides being more or less checked. The simultaneous delivery of the materials from the two receptacles, and the different rates of feeding and a central delivery of all the materials gives a most efficient mixing of the materials at the sides and centre.

The funnel 4 at the centre again deposits the material first in the central nest of the second unit from which point it overflows to the sides, and fills up the lower unit or hopper as indicated in Figure 1 in dotted lines therein. The bottom doors being then opened, the material is again released and the mixing operation described above is repeated by the discharge of the material from the centre and sides at different rates and simultaneously. The material is then deposited in the discharge member 63 at this point, the flow at the sides being checked by the tapering opening 65 and accelerated by the straight opening 61 at the centre, the flow of the material from the sides being more or less maintained by the friction of the downwardly flowing stream at the centre, a still further mixing is accomplished. This is due to the differences in rate of feed and to the delivery of the material from the sides and the centre at the same point, as already outlined. The discharged material is thus passed through three successive mixing operations.

While the structure described provides for three mixing operations, as outlined, it is, of course, apparent that the scope of the invention is not limited as to the number and arrangement of the mixing units or their relative positions, which may be widely varied without departure from the features of the individual units or from the characteristic features of this batcher.

I have described specifically and in detail a single embodiment of my invention in order that the nature and operation of the preferred form thereof may be fully understood; however, the specific terms herein are used descriptively rather than in a limiting sense, the scope of the invention being defined in the claims.

What I claim and desire to secure by Letters Patent is:

1. In an apparatus for mixing comminuted materials, a removable support for all the materials, an upright wall intermediately of said support, an upright wall at the sides of the support, means for depositing the material to be mixed on the side of the first-mentioned wall remote from the side wall, permitting it to accumulate and overflow between the first-mentioned wall and the side wall, and means for moving the support whereby the accumulations on the two sides of the first-mentioned wall are released and permitted to flow downwardly.

2. In an apparatus for mixing comminuted materials, a removable support for the materials to be mixed, an upright wall intermediately of said support, an upright wall at the sides of the support, means for depositing the material to be mixed on the side of the first-mentioned said wall, remote from the side wall, permitting it to accumulate and overflow between the first-mentioned wall and the side wall, means for removing the support whereby the accumulations on the two sides of the first-mentioned wall are released and permitted to flow downwardly simultaneously, and means for retarding the flow of the material accumulated outside the first-mentioned wall.

3. In a gravity mixer, a hopper having a central enclosure open at the top, a door closing the bottom of the hopper including said enclosure, the enclosure being spaced inwardly from the walls of the hopper, and means for depositing material in the enclosure and permitting it to accumulate therein and flow over the top of the enclosure to a position in the hopper outside the nest whereby when the door is opened, the material accumulated both inside and outside the nest is released and permitted to flow downwardly.

4. In a gravity mixer, a hopper having a central enclosure open at the top, a door closing the bottom of the hopper including said enclosure and other portions of the hopper, the enclosure being spaced inwardly from the outside walls of the hopper, and means for depositing material in the enclosure and permitting it to accumulate therein and flow over the top of the enclosure to a position in the hopper outside the enclosure whereby when the door is open, the material accumulated both inside and outside the enclosure is released and permitted to flow downwardly, and means for retarding the flow of the material deposited outside the nest.

5. A mixture for comminuted materials having a hopper with an inside enclosure therein open at the top, the enclosure being spaced from a side of the hopper, means for depositing material within the enclosure, permitting it to overflow at the sides, and a door at the bottom of the hopper intersected by the wall of said enclosure.

6. In an apparatus for mixing comminuted materials comprising a hopper having a nest spaced inwardly away from the side of the hopper, means for introducing material into the nest, the nest being open at the top to permit the material after accumulating therein to flow over the sides and fill the remainder of the hopper, doors pivoted intermediately of the hopper to swing downwardly at the sides, said doors closing the bottom of the nest and portions of the hopper between the nest and the sides of the hopper.

7. In an apparatus for mixing comminuted materials comprising a hopper having a nest spaced inwardly from the side of the hopper, means for introducing material into the nest, the nest being open at the top to permit the material after accumulating therein to flow over the sides and fill the remainder of the hopper, doors pivoted intermediately of the hopper to swing downwardly at the sides, said doors closing the bottom of the nest and portions of the hopper between the nest and the sides of the hopper, and a deflector for shielding the pivoted edges of the door and preventing the deposit of the material therebetween.

8. In an apparatus for mixing comminuted materials, a hopper having a nest open at the top spaced inwardly from the sides of the hopper with feeding means for depositing the material to be mixed in the nest and permitting it to overflow the sides of the nest after it has accumulated therein, a door closing the bottom of the nest and other portions of the hopper, a second hopper having a similar nest and a corresponding door beneath the first-mentioned hopper, means between the hoppers for turning the material inwardly toward the centre.

9. In an apparatus for mixing comminuted materials, a hopper having a nest open at the top spaced inwardly from the sides of the hopper with feeding means for depositing the material to be mixed in the nest and permitting it to overflow the sides of the nest after it has accumulated therein, a door closing the bottom of the nest and other portions of the hopper, a second hopper having a similar nest and a corresponding door beneath the first-mentioned hopper, means between the hoppers for turning the material inwardly toward the centre, means for leading the material downwardly from the second hopper and discharging it, including a discharge control comprising an unobstructed vertical passage and downwardly tapering passages at the sides.

10. In an apparatus for mixing dry materials, an upper mixing unit having a nest open at the top, side walls enclosing and extending above the nest, the nest being spaced inwardly from the side walls, a feed opening directing the material into the nest, a door closing the bottom of the mixing unit, means below the mixing unit for turning the material inward toward the center of the apparatus, a second mixing unit also comprising a nest and side walls extending above the nest and spaced away from the nest, a door closing the bottom of the mixing unit.

11. In an apparatus for mixing dry materials, an upper mixing unit having a nest open at the top, side walls enclosing and extending above the nest, the nest being spaced inwardly from the side walls, a feed opening directing the material into the nest, a door closing the bottom of the mixing unit, means below the mixing unit for turning the material inward toward the centre of the apparatus, a second mixing unit also comprising a nest and side walls extending above the nest and spaced away from the nest, a door closing the bottom of the mixing unit, discharging means and a discharge control having a substantially vertical downward passage, and a side passage of downwardly decreasing cross-section.

12. In a mixing apparatus, an upper mixing unit having a central nest open at the top with side walls extending above the nest, the nest being spaced inwardly from the side wall, doors closing the bottom of the hopper and pivoted intermediately to swing downward at the sides, the edges of the doors being beneath the space between the nest and the walls of the hopper, a deflecting shield covering the hinged edges of the doors, means for depositing material in the nest, and a second mixing unit beneath the first mixing unit.

Signed by me at Baltimore, Maryland, this 1st day of December, 1925.

AUGUSTUS J. SACKETT.